(12) United States Patent
Willardson et al.

(10) Patent No.: US 11,699,256 B1
(45) Date of Patent: Jul. 11, 2023

(54) APPARATUS FOR GENERATING AN AUGMENTED REALITY

(71) Applicant: Gravystack, Inc., Phoenix, AZ (US)

(72) Inventors: Chad Willardson, Phoenix, AZ (US); Scott Donnell, Phoenix, AZ (US); Travis Adams, Phoenix, AZ (US)

(73) Assignee: Gravystack, Inc., Phoenix, AZ (US)

( * ) Notice: Subject to any disclaimer, the term of this patent is extended or adjusted under 35 U.S.C. 154(b) by 0 days.

(21) Appl. No.: 17/872,630

(22) Filed: Jul. 25, 2022

(51) Int. Cl.
*G06T 13/40* (2011.01)
*G06T 19/00* (2011.01)
*G06F 40/205* (2020.01)
*G06F 40/35* (2020.01)
*G06F 40/284* (2020.01)
*G06F 3/16* (2006.01)

(52) U.S. Cl.
CPC .............. *G06T 13/40* (2013.01); *G06F 3/167* (2013.01); *G06F 40/205* (2020.01); *G06F 40/284* (2020.01); *G06F 40/35* (2020.01); *G06T 19/006* (2013.01)

(58) Field of Classification Search
None
See application file for complete search history.

(56) References Cited

U.S. PATENT DOCUMENTS

| | | | |
|---|---|---|---|
| 2016/0217623 A1* | 7/2016 | Singh | G09G 5/00 |
| 2016/0253679 A1* | 9/2016 | Venkatraman | G06Q 30/0185 |
| | | | 705/310 |
| 2020/0187334 A1* | 6/2020 | Crawford | G06F 3/04815 |
| 2021/0192824 A1* | 6/2021 | Chen | H04L 51/02 |

\* cited by examiner

*Primary Examiner* — Tapas Mazumder
(74) *Attorney, Agent, or Firm* — Caldwell Intellectual Property Law

(57) ABSTRACT

In an aspect, an apparatus for generating an augmented reality is presented. An apparatus includes at least a processor and a memory communicatively connected to the at least a processor. A memory includes instructions configuring at least a processor to receive optical data through a sensing device in electronic communication with at least a processor. At least a processor is configured to generate an augmented reality view through a display device as a function of optical data. An augmented reality view includes a virtual avatar. At least a processor is configured to analyze at least an environmental element of optical data. At least a processor is configured to compare at least an environmental element to a priority threshold. At least a processor is configured to display at least a message through a display device as a function of a comparison.

20 Claims, 6 Drawing Sheets

APPARATUS FOR GENERATING AN AUGMENTED REALITY

FIELD OF THE INVENTION

The present invention generally relates to the field of augmented reality (AR). In particular, the present invention is directed to an apparatus for generating an augmented reality.

BACKGROUND

Modern augmented reality fails to provide informative data of environments in an easy to understand presentation. As such, modern augmented reality can be improved.

SUMMARY OF THE DISCLOSURE

In an aspect, an apparatus for generating an augmented reality is presented. An apparatus includes at least a processor and a memory communicatively connected to the at least a processor. A memory includes instructions configuring at least a processor to receive optical data through a sensing device in electronic communication with at least a processor. At least a processor is configured to generate an augmented reality view through a display device as a function of optical data. An augmented reality view includes a virtual avatar. At least a processor is configured to analyze at least an environmental element of optical data. At least a processor is configured to compare at least an environmental element to a priority threshold. At least a processor is configured to display at least a message through a display device as a function of a comparison.

In another aspect, a method of generating an augmented reality using a computing device is presented. A method includes receiving optical data through a sensing device in electronic communication with at least a processor. A method includes generating an augmented reality view through a display device as a function of optical data. An augmented reality view includes a virtual avatar. A method includes analyzing at least an environmental element of optical data. A method includes comparing at least an environmental element to a priority threshold. A method includes display at least a message through a display device as a function of a comparison.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to augmented reality. In an embodiment, an apparatus for generating an augmented reality view is presented.

Aspects of the present disclosure can be used to provide prioritized information to a user through an easily digestible display. Aspects of the present disclosure can also be used to facilitate learning of one or more skills. This is so, at least in part, because an augmented reality view may be customized for a variety of scenarios.

Aspects of the present disclosure allow for augmented reality views including virtual avatars. Exemplary embodiments illustrating aspects of the present disclosure are described below in the context of several specific examples.

Figure 1:
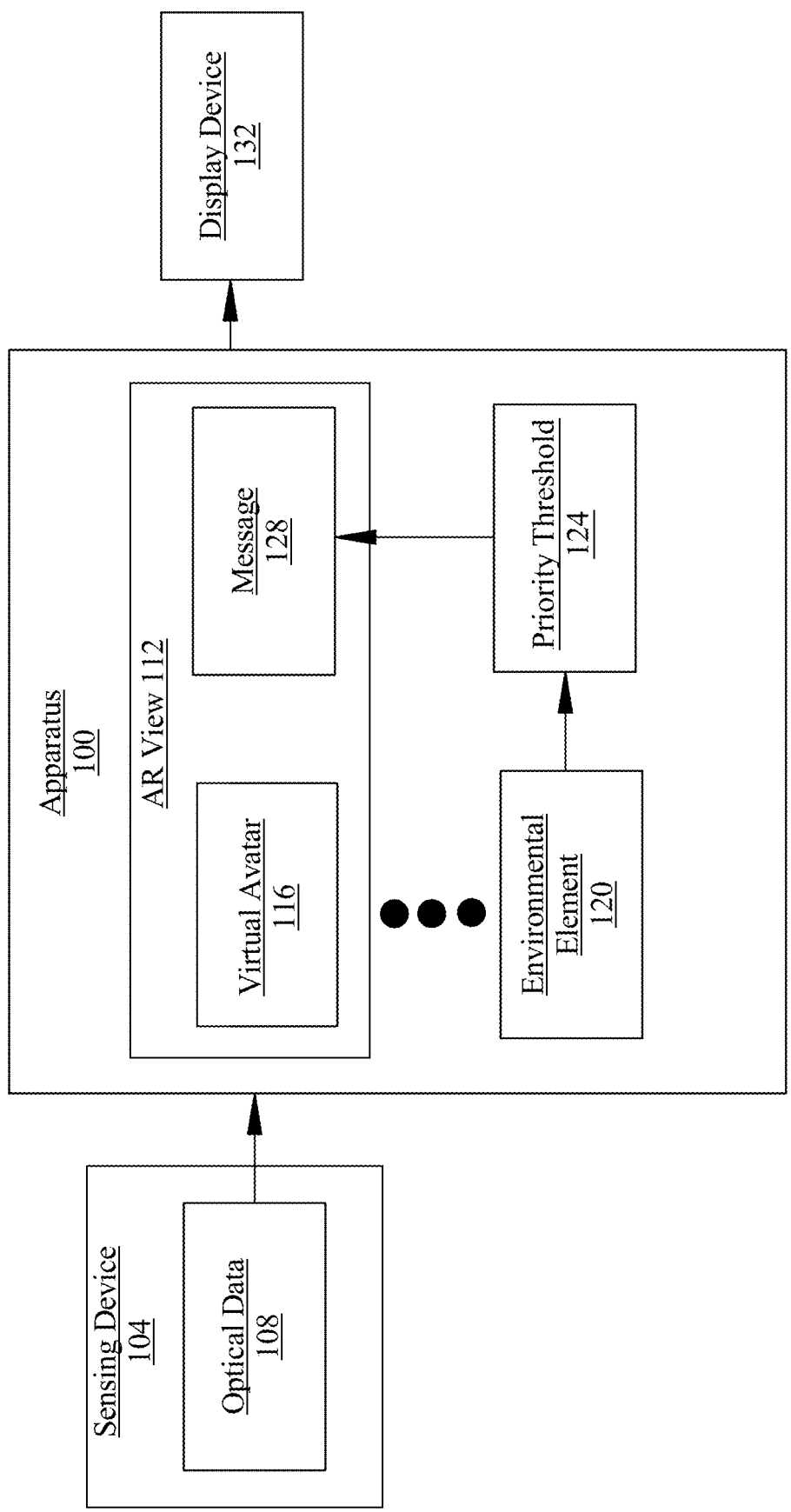
FIG. 1 is a block diagram of an apparatus for generating an augmented reality view.

Referring now to FIG. 1, an exemplary embodiment of an apparatus 100 for animating user data is presented. Apparatus 100 may include at least a processor and a memory communicatively connected to the at least a processor. A memory may contain instructions configuring the at least a processor to perform various tasks. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include a computing device. A computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of system 100 and/or computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 may be configured to receive optical data 108 from sensing device 104. A "sensing device" as used in this disclosure is a device that detects natural one or more physical and/or energetic signals and/or phenomena and converts the one or more physical and/or energetic signals and/or phenomena into electronic signals. Sensing device 104 may include, but is not limited to, cameras, infrared sensors, lidar sensor, radar sensors, photodetectors, vibration and/or audio sensors, temperature sensors, sensors of electrical phenomena, electromagnetic phenomena, or the like, force, load, pressure, and/or displacement sensors, any component or device that transduces physical and/or energetic signals and/or phenomena into electric signals, or any homogeneous or heterogeneous combination of any of the above into arrays, batteries, or the like. In some embodiments, sensing device 104 may include one or more depth sensors. Sensing device 104 may be in electronic communication with apparatus 100. "Electronic communication" as used throughout this disclosure is a form of data connection between two or more devices. Sensing device 104 may transmit optical data 108 to apparatus 100. "Optical data" as used throughout this disclosure is data obtained by and/or derived from, capture of light emitted, reflected, and/or refracted from, off, or through objects exterior to a sensing device. "Visual elements" as used in this disclosure are elements of data relating to sight. Visual elements may include, without limitation, color, motion, contrast, sharpness, and the like. Optical data 108 may include data such as, but not limited to, exposure, color, contrast, brightness, sharpness, motion, depth, and the like thereof. Optical data 108 may include information of one or more parts of a surrounding environment of sensing device 104 and/or apparatus 100.

Still referring to FIG. 1, as used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image. Optical data 108 may include image data as described above, without limitation.

Still referring to FIG. 1, in some embodiments, apparatus 100 may include a machine vision system. A "machine vision system" as used throughout this disclosure is a module, component, or device that allows a computing device to analyze visual and/or optical data regarding and/or captured from an environment A machine vision system may use images from a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and φ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, an exemplary range-imaging camera that may be included in sensing device 104 is Intel® RealSense™ D430 Module, from Intel® of Mountainview, Calif., U.S.A. D430 Module comprises active infrared (IR) illumination and a stereoscopic camera, having global shutters and frame rate of up to 90 fps. D430 Module provide a field of view (FOV) of 85.2° (horizontal) by 58° (vertical) and an image resolution of 1280×720. Range-sensing camera may be operated independently by dedicated hardware or, in some cases, range-sensing camera may be operated by a computing device. In some cases, range-sensing camera may include software and firmware resources (for execution on hardware, such as without limitation dedicated hardware or a computing device). D430 Module may be operating using software resources including Intel® RealSense™ SDK 2.0, which include opensource cross platform libraries. An exemplary machine vision camera that may be included in sensing device 104 is an OpenMV Cam H7 from OpenMV, LLC of Atlanta, Ga., U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

Still referring to FIG. 1, in some embodiments, sensing device 104 may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera is TaraXL from e-con Systems, Inc of San Jose, Calif. TaraXL is a USB 3.0 stereo-camera which is optimized for NVIDIA® Jetson AGX Xavier™/Jetson™ TX2 and NVIDIA GPU Cards. TaraXL's accelerated Software Development Kit (TaraXL SDK) is capable of doing high quality 3D depth mapping of WVGA at a rate of up to 60 frames per second. TaraXL is based on MT9V024 stereo sensor from ON Semiconductor. Additionally, TaraXL includes a global shutter, houses 6 inertial measurement units (IMUs), and allows mounting of optics by way of an S-mount lens holder. TaraXL may operate at depth ranges of about 50 cm to about 300 cm.

Still referring to FIG. 1, in some embodiments, apparatus 100 may be configured to generate augmented reality (AR) view 112. An "augmented reality view" as used in this disclosure is an augmented display of virtual content mixed with visual and/or optical data of surroundings of a sensor, which visual or optical data may be displayed to provide an apparently real view of surroundings analogous to that seen by a person without assistance of a device; augmented reality view may thus create an illusive effect whereby virtual content appears to be part of, and/or to be interacting with, visual and/or optical data and/or phenomena represented thereby. Real surroundings may include, but are not limited to, parks, offices, rooms, garages, shops, restaurants, streets, cities, and the like. AR view 112 may include, but is not limited to, location-based AR, projection based AR, overlay AR, marker-based AR, marker-less AR, and/or contour AR, without limitation. Apparatus 100 may generate AR view 112 through any machine vision process as described above. In some embodiments, apparatus 100 may generate AR view 112 through, but not limited to, a web portal, mobile application, and/or through a cloud-computing network. Apparatus 100 may communicate and/or display AR view 112 through display device 132. A "display device" as used throughout this disclosure is a device having a content showing portion. A "content showing portion" as used in this disclosure is a section of a display that conveys information, for instance and without limitation using displays as described in this disclosure. Display device 132 may include, but is not limited to, smartphones, tablets, laptops, monitors, headsets, glasses, and the like.

Still referring to FIG. 1, AR view 112 may include one or more virtual icons. A "virtual icon" as used throughout this disclosure is a graphic displayed on a screen. Virtual icons may include, but are not limited to, text boxes, characters, menus, navigation markers, and the like. In some embodiments, a virtual icon may include a three-dimensional (3D) icon. A "three-dimensional icon" as used in this disclosure is a graphic displayed as having x, y, and z coordinates. 3D icons may include, but are not limited to, arrows, characters, object representations, and the like. Apparatus 100 may generate a digital coordinate system that may represent a real-world coordinate system, such as using a machine vision process as described above. Apparatus 100 may position one or more virtual icons in a digital coordinate system which may correspond to real-world locations. Apparatus 100 may modify a virtual icon's coordinate system, width, length, height, and the like, which may maintain a real world visual aspect. A "real world visual aspect" as used throughout this disclosure is a perspective view of an entity and/or object of a virtual icon that simulates real world movement. In some embodiments, AR view 112 may display one or more virtual icons that may move across a screen relative to a real-world location. For instance and without limitation, a virtual icon representing a box may be displayed in AR view 112 across a screen. A user may move in the real world, and the virtual box may move across a screen relative to the user's movement, appearing on a screen as though the virtual box has not moved relative to the user's movement. Continuing this example, a user may move closer to the virtual box, to which AR view 112 may display the virtual box as bigger on a screen, and smaller if a user moves further away from the virtual box. One of ordinary skill in the art, upon reading this disclosure, will appreciate the ways in which virtual objects may be displayed in augmented reality. "Virtual objects" as used in this disclosure are graphics, entities, and/or icons generated from a computer memory. Virtual objects may be generated from received optical and/or visual data stored in a memory. This is different to reproductions of currently captured and/or received optical and/or visual data. Virtual objects may modify a view of a surrounding instead of simply recreating a view of a surrounding.

Still referring to FIG. 1, in some embodiments, optical data 108 may include text data. "text data" as used throughout this disclosure is information relating to semantics. Text data may include but is not limited to, fonts, sizes, characters, strings, words, phrases, exclamations, and the like. For instance and without limitation, optical data 108 may include text data which may include nutritional information of a bag of chips. Apparatus 100 may determine text data using a language processing module. A "language processing module" as used in this disclosure is a computer process that analyzes semantic data. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or apparatus 100 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into apparatus 100. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, apparatus 100 may utilize a language processing module as described above to extrapolate text data from optical data 108. Apparatus 100 may display text data through AR view 112. Displaying text data may include displaying virtual text interpreted from text found in optical data 108. For instance and without limitation, optical data 108 may include a street sign. Apparatus 100 may determine text data from the street sign and display the text on the street sign in a more readable virtual format.

Still referring to FIG. 1, apparatus 100 may determine environmental element 120 from optical data 108. An "environmental element" as used in this disclosure is a datum relating to a surrounding of an object and/or individual. Environmental element 120 may include, without limitation, objects, vehicles, individuals, signs, buildings, offices, and the like. Apparatus 100 may determine environmental element 120 using a machine vision process as described above. In some embodiments, apparatus 100 may determine environmental element 120 as a function of an environmental element machine learning model. An environmental element machine learning model may be trained with training data correlating optical data to one or more environmental elements. Training data may be received through user input, external computing devices, and/or previous iterations of processing. An environmental element machine learning model may be configured to input optical data and output environmental elements. In some embodiments, apparatus 100 may classify one or more elements of environmental element 120 to an environmental category. An "environmental category" as used in this disclosure is a classification of environment data to one or more groups. Environmental categories may include, without limitation, cars, trucks, bicycles, individuals, food items, electronics, trees, animals, and the like. In some embodiments, apparatus 100 may use an environmental element classifier to classify environmental elements to one or more environmental categories. An environmental classifier may be trained with training data correlating environmental elements to one or more environmental categories. Training data may be received from user input, external computing devices, and/or previous iterations of processing.

Still referring to FIG. 1, apparatus 100 may utilize a feature learning algorithm to determine environmental element 120. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of sets of environmental elements and/or optical data 108, as defined above, with each other. As a non-limiting example, feature learning algorithm may detect co-occurrences of environmental elements, as defined above, with each other. Apparatus 100 may perform a feature learning algorithm by dividing environmental data from optical data into various sub-combinations of such data to create environmental element data sets as described above, and evaluate which environmental element data sets tend to co-occur with which other environmental element data sets; for instance, where environmental element data includes products, apparatus 100 may divide each environmental element data into individual products and evaluate which individual products and/or combinations thereof tend to co-occur with which other individual products, and/or other environmental element data. In an embodiment, a first feature learning algorithm may perform clustering of data.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, apparatus 100 may generate a k-means clustering algorithm receiving unclassified optical data and outputs a definite number of classified environmental element data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related environmental element data, which may be provided with object labels; this may, for instance, generate an initial set of object labels from an initial set of environmental element data of a large number of objects, and may also, upon subsequent iterations, identify new clusters to be provided new object labels, to which additional environmental element data may be classified, or to which previously used environmental element data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $\text{argmin}_{c_i \ni c} \text{dist}(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected environmental element data set. Degree of similarity index value may indicate how close a particular combination of environmental elements, products and/or optical data is to being classified by k-means algorithm to a particular cluster. K-means clustering algorithm may evaluate the distances of the combination of environmental elements, products and/or optical data to the k-number of clusters output by k-means clustering algorithm. Short distances between a set of environmental element data and a cluster may indicate a higher degree of similarity between the set of environmental element data and a particular cluster. Longer distances between a set of environmental element data and a cluster may indicate a lower degree of similarity between an environmental element data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an environmental element data set and the data entry cluster. Alternatively or additionally k-means clustering algorithm may select a plurality of clusters having low degree of similarity index values to environmental element data sets, indicative of greater degrees of similarity. Degree of similarity index values may be compared to a threshold number indicating a minimal degree of relatedness suitable for inclusion of a set of environmental data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

Still referring to FIG. 1, in some embodiments, apparatus 100 may display an identifying element of environmental element 120 through AR view 112. An "identifying element" as used in this disclosure is a visual indicator displayed on a screen. An identifying element may include, but is not limited to, highlighting a border of environmental element 120 in AR view 112, displaying an arrow denoting a position of environmental element 120 in AR view 112, and the like. For instance and without limitation, environmental element 120 may include a dollar. Apparatus 100 may highlight a digital border of the real world dollar shown through AR view 112. In some embodiments, apparatus 100 may compare environmental element 120 to priority threshold 124. A "priority threshold" as used in this disclosure is a value and/or range of values constraining a prioritization of data. Priority threshold 124 may include one or more numbers, such as, without limitation, "0", "1", "5", "10", and the like. Apparatus may generate priority threshold 124 as a function of an object of interest. An "object of interest" as used in this disclosure is an object having a high importance relative to an individual and/or objective. For instance and without limitation, an object of interest may include shoes, coins, coffee cups, headphones, and the like. Objects of interest may be determined through user input and/or by apparatus 100 through processing. Apparatus 100 may denote varying priority values to various objects of interest. As a non-limiting example, a pair of shoes may have a priority value of "1", while a wallet may have a priority value of "5", where a higher value equates to a higher priority. Apparatus 100 may determine a priority value of one or more objects of interest by comparing a relative importance of the objects to a user objective. A "user objective" as used throughout this disclosure is a goal of an individual. User objectives may include, but are not limited to, travelling distances, retrieving items, acquiring items, distributing items, learning sports skills, learning languages, and the like. Apparatus 100 may receive a user objective through user input, external computing devices, and/or calculate a user objective for a user as a function of user data. Apparatus 100 may determine a relative importance of objects through any machine learning process as described throughout this disclosure, without limitation.

Still referring to FIG. 1, apparatus 100 may generate an objective function to compare environmental element 120 with priority threshold 124. An "objective function" as used in this disclosure is a process of minimizing or maximizing one or more values based on a set of constraints. In some embodiments, an objective function may include an optimization criterion. An optimization criterion may include any description of a desired value or range of values for one or more attributes of entity data; desired value or range of values may include a maximal or minimal value, a range between maximal or minimal values, or an instruction to maximize or minimize a diagnostic criterion. As a non-limiting example, an optimization criterion may specify that environmental element 120 should be within a 10% difference of a priority threshold 124; an optimization criterion may cap a difference of environmental element 120 and priority threshold 124, for instance specifying that environmental element 120 must not have a difference from priority threshold 124 greater than a specified value. An optimization criterion may specify one or more tolerances for differences in priority thresholds 124 and/or environmental element 120. An optimization criterion may specify one or more criterion for priority threshold 124. In an embodiment, an optimization criterion may assign weights to different environmental element data or values associated with environmental elements; weights, as used herein, may be multipliers or other scalar numbers reflecting a relative importance of a particular datum or value. One or more weights may be expressions of value to a user of a particular outcome, user objective importance, or other facet of a comparison process. As a non-limiting example, minimization of low importance may be multiplied by a first weight, while tolerance above a certain value may be multiplied by a second weight. Optimization criteria may be combined in weighted or unweighted combinations into a function reflecting an overall outcome desired by a user; a function may be an environmental element data classification function to be minimized and/or maximized. A function may be defined by reference to environmental element classification criteria constraints and/or weighted aggregation thereof as provided by apparatus 100; for instance, an environmental element classification function combining optimization criteria may seek to minimize or maximize a function of a comparison process of environmental element data.

Still referring to FIG. 1, generation of an objective function may include generation of a function to score and weight factors to achieve a priority score for each feasible pairing. In some embodiments, pairings may be scored in a matrix for optimization, where columns represent environmental elements and rows represent priority scores potentially paired therewith; each cell of such a matrix may represent a score of a pairing of the corresponding environmental element to the corresponding priority score. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 100 may select pairings so that scores associated therewith are the best score for each testing datum match and/or for each diagnosis criterion threshold. In such an example, optimization may determine the combination of environmental element matches such that each priority score pairing includes the highest score possible.

Still referring to FIG. 1, an objective function may be formulated as a linear objective function. Apparatus 100 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all environmental elements r, S is a set of all priority scores s, $c_{rs}$ is a score of a pairing of a given environmental element with a given priority score, and $x_{rs}$ is 1 if an environmental element r is paired with a priority score s, and 0 otherwise. Continuing the example, constraints may specify that each environmental element is assigned to only one priority score, and each priority score is assigned only one environmental element. Environmental elements and priority scores may include environmental elements and priority scores as described above. Sets of priority scores may be optimized for a maximum score combination of all generated priority scores. In various embodiments, apparatus 100 may determine a combination of environmental elements that maximizes a total score subject to a constraint that all environmental elements are paired to exactly one priority score. Not all priority scores may receive an environmental element pairing since each priority score may only produce one environmental element. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 100 and/or another device, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score environmental elements as described above, calculate an output of mathematical expression using the variables, and select a pairing that produces an output having the lowest size, according to a given definition of "size," of the set of outputs representing each of plurality of plurality score combinations; size may, for instance, included absolute value, numerical size, or the like. Selection of different loss functions may result in identification of different potential pairings as generating minimal outputs. Objectives represented in an objective function and/or loss function may include minimization of differences between environmental elements and a priority score. Objectives may include minimization of low priority scores.

Still referring to FIG. 1, in some embodiments, apparatus 100 may generate virtual avatar 116 and display virtual avatar 116 through AR view 112. A "virtual avatar" as used in this disclosure is any digital creation displayed through a screen. Digital creations may include, but are not limited to, digital entities, virtual objects, and the like. Virtual avatar 116 may include, without limitation, two-dimensional representations of animals and/or human characters, three-dimensional representations of animals and/or human characters, and the like. For instance and without limitation, virtual avatar 116 may include penguins, wolves, tigers, frogs, young human characters, old human characters, middle-aged human characters, and the like. In some embodiments, virtual avatar 112 may include clothing, apparel, and/or other items. Clothing may include, but is not limited to, jackets, pants, shirts, shorts, suits, ties, and the like. Apparel may include, but is not limited to, skis, ski goggles, baseball mitts, tennis rackets, suitcases, and the like. Virtual avatar 116 may be generated as a function of user input. For instance and without limitation, apparatus 100 may generate virtual avatar 116 through user selection of a menu of virtual avatars 116 presented to a user. Virtual avatar 116 may be customizable through user input received at apparatus 100. Apparatus 100 may generate one or more character creation screens, clothing screens, and/or other changeable attributes of virtual avatar 116 through AR view 112. For instance and without limitation, AR view 112 may display a character selection screen, which may include a character type, clothing type, facial hair type, hair type, facial expression type, and/or other attributes of virtual avatar 116. In some embodiments, apparatus 100 may generate virtual avatar 116 as a function of a user objective. For instance and without limitation, a user objective may include a goal of making a peanut butter and jelly sandwich, to which apparatus 100 may generate virtual avatar 112 to include a 3D dog dressed as a chef.

Still referring to FIG. 1, apparatus 100 may generate virtual avatar 116 to respond to one or more environmental elements 120. For instance and without limitation, environmental element 120 may include a smoothie and virtual avatar 116 may include a 3D bear. Virtual avatar 116 may animate to point at a smoothie of environmental element 120, show expressions of joy, hunger, and the like. "Animation" as used in this disclosure is a process of moving one or more digital elements between two or more positions. For instance and without limitation, a three dimensional bear may be animated from a sitting position to a standing position. Animation may include generating two or more frames of a digital creation. For instance and without limitation, a digital bear may animate from a sitting position to a standing position in 18 frames, at a framerate of 30 frames per second (fps). In some embodiments, apparatus 100 may generate virtual avatar 116 as a function of a detected geographic location, which may be determined through a location sensor of sensing device 104. For instance and without limitation, environmental element 120 may include a food aisle of a grocery store, to which apparatus 100 may generate virtual avatar 116 to include a 3D representation of a cartoon penguin. In some embodiments, animation may be generated using stored rules for representation and/or modification of static images. Stored rules may include, without limitation, rules associating an event as detected by sensing devices with an image and/or sound representing a reaction thereto by an animated character. For instance, a given event and/or input may be associated with an endpoint image, such as a "surprising" event with an image of an avatar with a surprised expression. Similar associations may be made between expressions and/or poses indicating simulated reactions to pleasing events, exciting events, annoying events, humorous events. Animated sequences may be stored transitioning from a first pose representing a first simulated emotional state and/or response and a second pose representing a second simulated emotional state and/or response. Alternatively or additionally, stored rules may indicate modifications to images and/or for creation of transitional images that can be used to generate an animated sequence of images from one simulated emotional state and/or response. Emotional states and/or responses may be regulated, without limitation, using a finite state machine directing transition from one emotional state and/or response to another.

Still referring to FIG. 1, stored rules, modified images, and/or modifications to images may be entered and/or defined manually; alternatively or additionally, modified images, and/or modifications to images may be generated using a machine-learning process that may be trained using manually generated images, modifications thereto, and/or sequences of such images and/or modifications, and/or manually identified examples of such training examples in existing animated and/or live-action stills and/or sequences. Machine-learning models may include models trained to recognize features in a picture of a character, models trained to modify identified features and/or entire images, models trained to identify and/or generate transitional images traversing from one static image to another static image in a sequence, or the like. Static images and/or modifications may be associated with responses to particular inputs by additional models. Animation may alternatively or additionally be accomplished using any method and/or components as described in U.S. Nonprovisional application Ser. No. 17/872,135, filed on Jul. 25, 2022, and entitled "APPARATUS AND METHOD FOR GENERATING A VIRTUAL AVATAR," the entirety of which is incorporated herein by reference.

Still referring to FIG. 1, in some embodiments, apparatus 100 may generate message 128. Message 128 may be generated as a function of a comparison of environmental element 120 to priority threshold 124. A "message" as used in this disclosure is a communication that relays information. Message 128 may include, without limitation, text, audio, video, images, and the like. Message 128 may include environmental data. "Environmental data" as used in this disclosure is information pertaining to a surrounding of an individual and/or device. A surrounding may include, but is not limited to, a physical environment, digital environment, virtual reality environment, and the like. Environmental data may include, but is not limited to, temperatures, locations, and the like. In some embodiments, message 128 may be generated as a function of user data. "User data" as used in this disclosure is information relating to an individual. User data may include, but is not limited to, value quantifier amounts, demographic information, geographic information, interests, goals, habits, and the like. In some embodiments, apparatus 100 may display message 128 through AR view 112. Message 128 may be displayed through AR View 112 as having a real world location and/or displayed stationary across a screen. Message 128 may include information about optical data 108 and/or environmental element 120. For instance and without limitation, message 128 may inform a user of details of streets, shops, products, finance accounts, and the like. Virtual avatar 116 may communicate message 128 to a user through AR view 112. Virtual avatar 116 may be animated to motion at a text box of message 128 and/or vocalize message 128, such as audibly reading message 128.

Still referring to FIG. 1, in some embodiments, apparatus 100 may generate a chatbot. A "chatbot" as used in this disclosure is a program that communicates semantic information between an individual and a computing device. "Semantic information" as used in this disclosure is data pertaining to language. Semantic information may include, but is not limited to, characters, symbols, phrases, sentences, fonts, capitalization, and the like. A chatbot may be communicative with apparatus 100. Apparatus 100 may be configured to operate a chatbot. In some cases, AR view 112 may be local to apparatus 100. Alternatively or additionally, in some cases, AR view 112 may be remote to apparatus 100 and communicative with apparatus 100, by way of one or more networks, such as without limitation the internet. Alternatively or additionally, AR view 112 may communicate with apparatus 100 using telephonic devices and networks, such as without limitation fax machines, short message service (SMS), or multimedia message service (MMS). In some embodiments, a chatbot of AR view 112 may communicate with apparatus 100 using text-based communication, for example without limitation using a character encoding protocol, such as American Standard for Information Interchange (ASCII). Apparatus 100 may interface with a chatbot, by way of at least a submission from a user, such as through AR view 112 to the chatbot, and a response from the chatbot to AR view 112. In many cases, one or both of submissions and responses may be text-based communication. Alternatively or additionally, in some cases, one or both of submissions and responses may be audio-based communication.

Continuing in reference to FIG. 1, a submission once received by apparatus 100 operating a chatbot, may be processed by apparatus 100. In some embodiments, apparatus 100 may processes a submission using one or more of keyword recognition, pattern matching, and natural language processing, machine learning models, and the like. In some embodiments, apparatus 100 may employ real-time learning with evolutionary algorithms. In some cases, apparatus 100 may retrieve a pre-prepared response from a storage component, based upon a submission. Alternatively or additionally, in some embodiments, apparatus 100 may communicate a response without first receiving a submission, which may initiate a conversation. A "response" as used in this disclosure is a communication provided as a function of an inquiry. A response may include, but is not limited to, answering a question and/or other forms of response. A "communication" as used in this disclosure is a sharing of information between two or more entities. For instance and without limitation, a communication may include textual data, visual data, audio data, and the like. In some cases, apparatus 100 may communicate an inquiry to AR view 112. Apparatus 100 may be configured to process an answer to the inquiry in a following submission from AR view 112. In some cases, an answer to an inquiry present within a submission from a user through AR view 112 may be used by apparatus 100 as an input to another function, for example without limitation a feature or a preference input.

Still referring to FIG. 1, virtual avatar 116 may be programmed to interact with a user. Interaction may include communicating with a user through a chatbot as described above. In other embodiments, virtual avatar 116 may be programmed to respond to one or more voice inputs received through sensing device 104. Voice inputs may include, but are not limited to, inquiries, commands, responses, and the like. For instance and without limitation, a voice input may include the phrase "Hi Bongo, what are my goals for today?" Virtual avatar 116 may respond to the voice input through speaking responses, displaying text boxes through AR view 112, and/or any combination thereof. Apparatus 100 may generate response for virtual avatar 116 through any language processing model, machine learning model, optimization model, and the like thereof, as described throughout this disclosure, without limitation.

Still referring to FIG. 1, in some embodiments, apparatus 100 may generate a web search as a function of data received from sensing device 104. A "web search" as used in this disclosure is a query through one or more databases for information. A web search may search through the Internet. A web search may be generated to find data such as, without limitation, object details, object value information, similar object results, and the like. For instance and without limitation, optical data 108 may include data of an orange juice bottle. Apparatus 100 may, through any process described above, without limitation, identify text data of the orange juice bottle. Apparatus 100 may generate a web search using one or more characters, words, symbols, and the like of the orange juice bottle. Apparatus 100 may find object data such as, but not limited to, producer information, nutritional information, value quantifiers, similar objects, and the like. Apparatus 100 may use a language processing module, clustering algorithm, and/or other process as described above, without limitation. In some embodiments, apparatus 100 may display text data of one or more objects through AR view 112, which may include static text boxes, moving text boxes, and the like. For instance and without limitation, apparatus 100 may generate AR view 112 to display a text box including text data of an object such that the text box appears to stay in a position above and/or adjacent to the object relative to a movement of sensing device 104 and/or a user's movement. In other embodiments, virtual avatar 116 may audibly communicate text data, web search results, and the like through one or more speakers of apparatus 100. For instance and without limitation, virtual avatar 116 may speak the phrase "This banana looks like a valuable asset!".

Still referring to FIG. 1, in some embodiments, apparatus 100 may determine a timing window for virtual avatar 116 to interact with a user. A "timing window" as used in this disclosure is a temporal period. A timing window may include, but is not limited to, seconds, minutes, hours, and the like. Apparatus 100 may determine a timing window for virtual avatar 116 to interact with a user as a function of, but not limited to, time from last user inquiry, environmental elements 120, and the like. For instance and without limitation, a user may walk to a geographically significant area, such as a kitchen. Apparatus 100 may determine that once a kitchen is within a 10 ft view of sensing device 104 and/or a user, virtual avatar 116 has a timing window to communicate message 128 of about 15 seconds. In other embodiments, a timing window may be generated as a function of user input. A user may provide voice inputs to sensing device 104, and apparatus 100 may determine a timing window of 3.5 seconds after a last voice input of a user for virtual avatar 116 to initiate an interaction.

Figure 2:
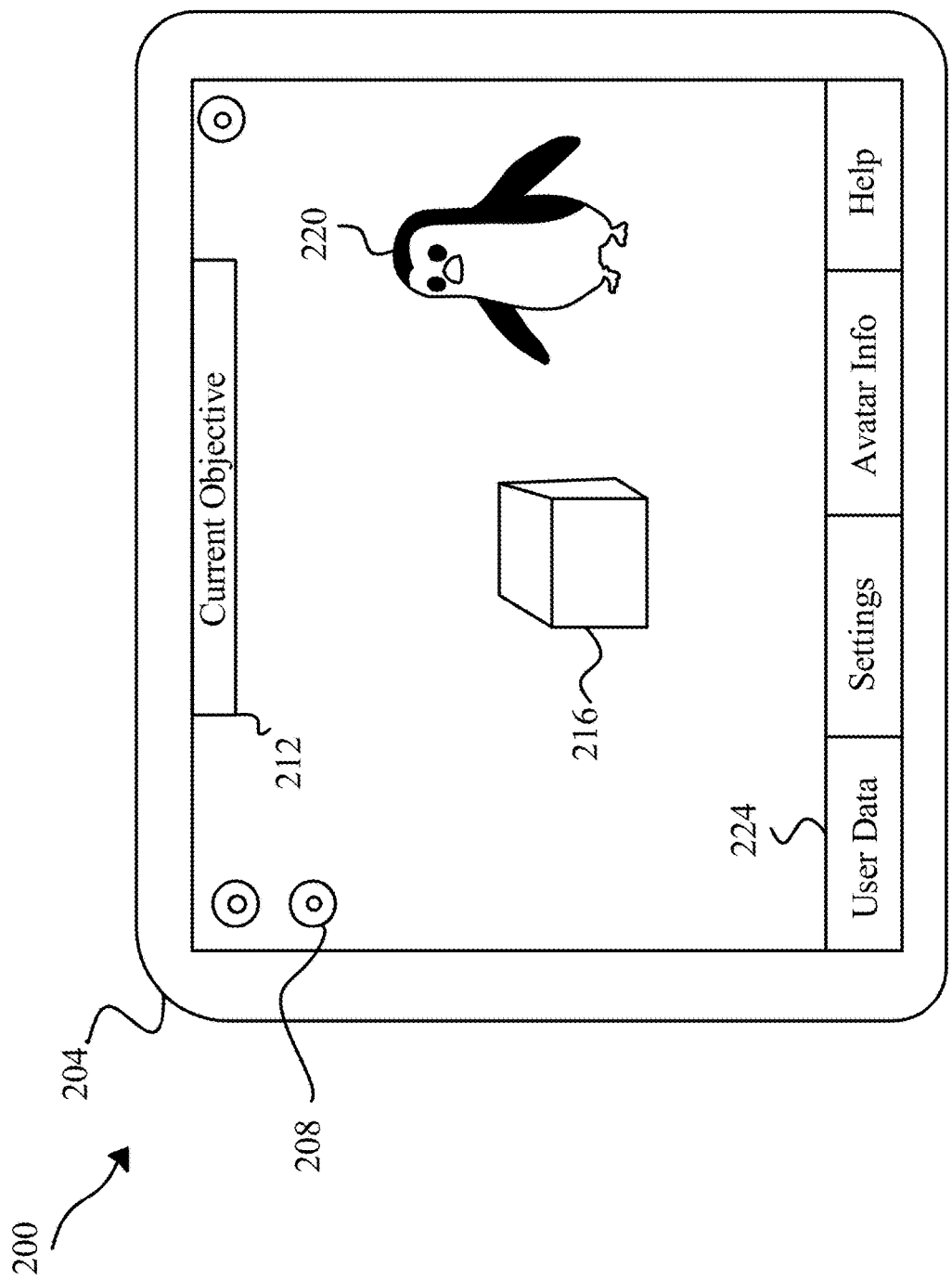
FIG. 2 is an illustration of an augmented reality view.

Referring now to FIG. 2, an illustration of an augmented reality view 200 on display device 204 is presented. Display device 200 may include, but is not limited to, tablets, smartphones, laptops, monitors, and the like. In some embodiments, AR view 200 may include interactive buttons 208. An "interactive button" as used in this discourse is a graphic icon having an event handler programmed to respond to user input. User input may include, without limitation, tapping, swiping, clicking, and the like. In some embodiments, interactive buttons 208 may be programmed to navigate one or more elements of AR view 200. AR view 200 may include AR view 112 as described above with reference to FIG. 1, without limitation. In some embodiments, interactive buttons 208 may be programmed to generate one or more popup windows, remove and/or add virtual icons to an AR view 200, and/or modify a heads up display (HUD) of AR view 200. For instance and without limitation, interactive buttons 208 may be programmed to show and/or hide user objective box 212. A "user objective box" as used throughout this disclosure is a text box displaying one or more goals of an individual. User objective box 212 may include, but is not limited to, a rectangular banner, a pop-up window, and the like. In some embodiments, user objective box 212 may include a transparency level. A transparency level may include, but is not limited to, highly transparent, moderately transparent, opaque, and the like. In some embodiments, user objective box 212 may be generated from apparatus 100 as described above with reference to FIG. 1, without limitation. User objective box 212 may display one or more objectives. For instance and without limitation, objectives may include learning a language, retrieving an item, accumulating a value of objects, and the like. User objective box 212 may include a percent completion of one or more tasks. For instance and without limitation, user objective box 212 may display three dots, where a full dot indicates a completion of a task and/or subtask. In some embodiments, AR view 200 may be modified as a function of received audio input. "Audio input" as used throughout this disclosure is data relating to soundwaves. Audio input may include, but is not limited to, vocalizations, notes, and/or other sounds. For instance and without limitation, a user may provide audio input of "what is my current task?" to which AR view 200 may display one or more parts of user objective box 212 and/or other windows including user objective data. Audio input may be received through, but not limited to, speech-to-text, language processing modules, and/or other processes as described throughout this disclosure, without limitation. In some embodiments, audio input may be categorized through an audio classifier. An audio classifier may be trained with training data correlating audio input to one or more audio categories, such as, but not limited to, speech, vocalizations, singing, and the like. Training data may be received through user input, external computing devices, and/or previous iterations of processing.

Still referring to FIG. 2, in some embodiments, AR view 200 may include virtual icon 216. Virtual icon 216 may include virtual icons as described above with reference to FIG. 1. In some embodiments, virtual icon 216 may include, but is not limited to, a 2D shape, 3D shape, and the like. In some embodiments, virtual icon 216 may include a representation of a real world object, such as, without limitation, coffee cups, wallets, books, smartphones, pets, and the like. Virtual icon 216 may include one or more indicators. Indicators may include, but are not limited to, arrows, directions, highlighted graphics, and the like. For instance and without limitation, virtual icon 216 may include a highlighted border of a real world object, such as a backpack. In some embodiments, AR view 200 may display a plurality of virtual icons 216. In some embodiments, virtual icon 216 may be programmed to interact with user input. A user may swipe, tap, and/or press a touch screen of display device 204, which may trigger an interaction with virtual icon 216. User input of tapping on virtual icon 216 may generate a text box including data of virtual icon 216. For instance and without limitation, virtual icon 216 may include a backpack. A user may tap on the backpack, which may generate a textbox presenting data of the contents of the backpack, last interaction with the backpack, and the like. In other embodiments, a user may rotate and/or shift virtual icon 216 across display device 204 through user input, such as, but not limited to, swiping and/or other touch inputs.

Still referring to FIG. 2, in some embodiments, AR view 200 may include virtual avatar 220. Virtual avatar 220 may include virtual avatar 116 as described above with reference to FIG. 1. In some embodiments, virtual avatar 220 may be programmed to engage with a user. Engagement of virtual avatar 220 may include, but is not limited to, one or more body movements, facial expressions, motioning to objects of interest, generating text boxes, speaking and/or communicating noises, and the like. A user may tap on virtual avatar 220 to initiate a conversation with virtual avatar 220. Tapping on virtual avatar 220 may generate a textbox, prompt voice input, and the like. In some embodiments, virtual avatar 220 may be programmed to receive communication from a user, determine a response as a function of the communication, and communicate the message to the user as a function of the response. A "communication" as used throughout this disclosure is a message conveyed between two or more entities. Communications may include, but are not limited to, textual conversations, speech, visual data, and/or other forms of communication. In some embodiments, communications may be received from visual input, such as, but not limited to, selfie cameras, other cameras, and/or other optical sensors. In some embodiments, user inputs may include captures of QR, SKU, RFID codes, and the like. In some embodiments, a response of virtual avatar 220 may be generated through a chatbot and displayed through AR view 200. In some embodiments, virtual avatar 220 may be programmed to communicate one or more messages, as described above with reference to FIG. 1 and below with reference to FIG. 3, without limitation.

Still referring to FIG. 2, in some embodiments, AR view 200 may include information modifiers 224. An "information modifier" as used in this disclosure is a graphical element programmed to change a portion of a display. A user may click on, touch, and/or swipe information modifiers 224. In some embodiments, information modifiers 224 may be displayed alongside a bottom portion of display device 204. In other embodiments, information modifiers 224 may be displayed on a side and/or top portion of display device 204. Information modifiers 224 may include a banner having one or more divided portions. For instance and without limitation, information modifiers 224 may include a rectangular banner having four separate smaller rectangles positioned within the rectangular banner. In some embodiments, information modifiers 224 may generate one or more menu screens, popup windows, and/or other text boxes. Menu screens may include, but are not limited to, avatar creation menus, objective menus, user data menus, AR view settings menus, help menus, and the like. As a non-limiting example, information modifier 224 may be programmed to generate a user objective window, which may scroll up from a bottom portion of display device 200 upon receiving user input. A user objective window may display an overall objective, tasks of an objective, percent completion of one or more objectives, categories of objectives, and the like. In some embodiments, information modifier 224 may generate an avatar creation menu. An avatar creation menu may be as described above with reference to FIG. 1.

Figure 3:
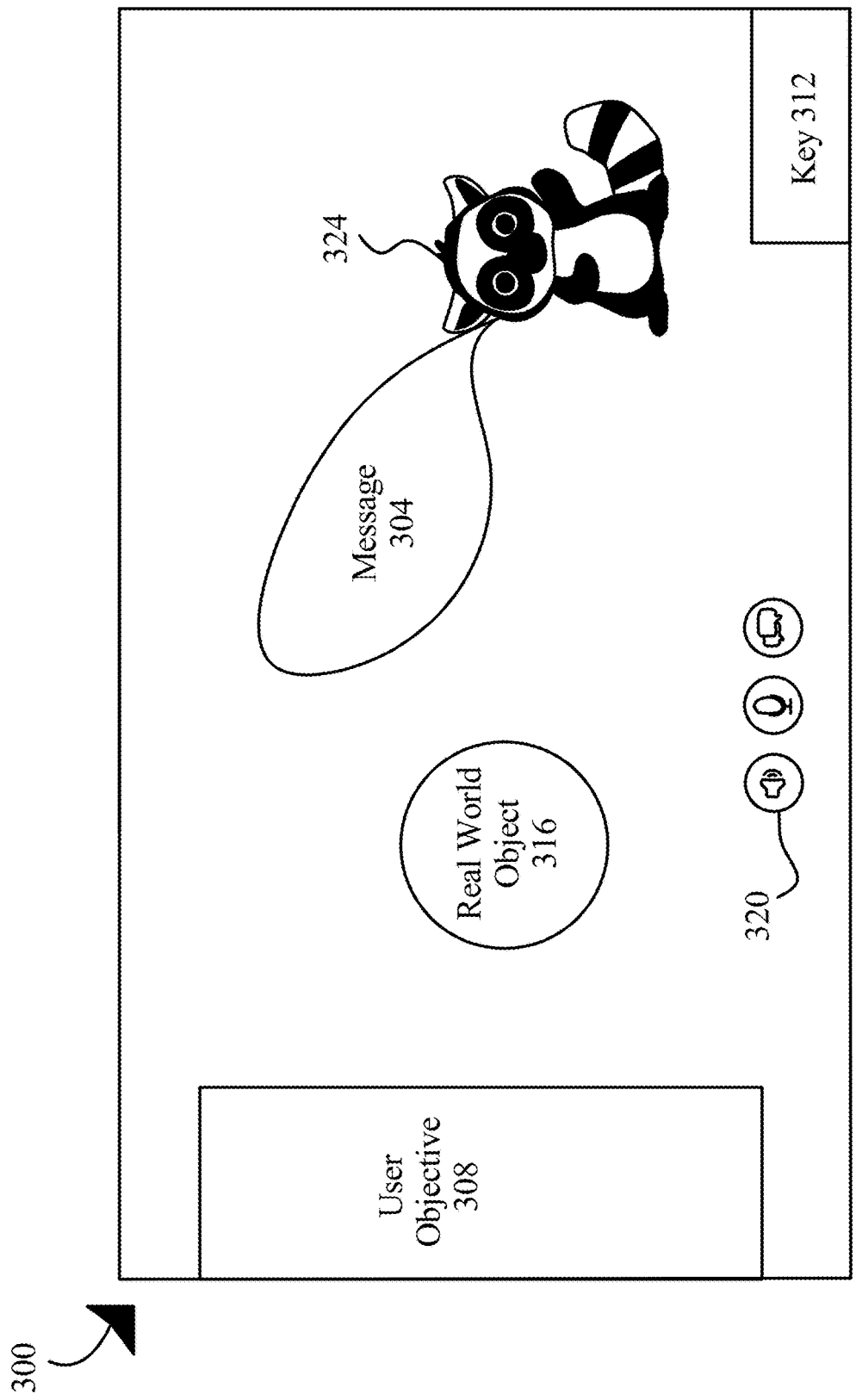
FIG. 3 illustrates another augmented reality view.

Referring now to FIG. 3, another illustration of an augmented reality view 300 is presented. AR view 300 may display user objective box 308. User objective box 308 may include a user objective box as described above. AR view 300 may display virtual avatar 324. Virtual avatar 324 may be as described above. AR view 300 may display real world object 316. A "real world object" as used in this disclosure is an item and/or entity having a physical form. Real world object 316 may include, but is not limited to, shoes, backpacks, clothes, food items, signs, and the like. In some embodiments, AR view 300 may display one or more virtual icons corresponding to real world object 316. For instance and without limitation, AR view 300 may display a highlighted border around real world object 316. In some embodiments, AR view 300 may include key 312. Key 312 may include one or more icons representing one or more objects of interest. For instance and without limitation, key 312 may include a flag icon, a smiley face icon, and a running icon, representing a checkpoint in an objective, a happiness of a virtual avatar, and an identified exercise activity of an environment, respectively.

Still referring to FIG. 3, in some embodiments, virtual avatar 324 may be programmed to communicate message 304 to a user. Message 304 may be communicated through audio output, visual output, and the like. Audio output may include speech, sounds, notification, and the like. In some embodiments, virtual avatar 324 may speak message 304 to a user. In other embodiments, virtual avatar 324 may generate a text box including message 304. Message 304 may include information of one or more environmental elements, such as, without limitation, objects, locations, and the like. In some embodiments, message 304 may be associated with a user objective. A user objective may include, but is not limited to, learning a language, completing a chore, interacting with one or more virtual icons, and the like. In some embodiments, a user objective may include maintaining value quantifiers. A "value quantifier" as used in this disclosure is a number representing a quantity of value. A value quantifier may include, but is not limited to, currency and/or other items having a value. A user objective of maintaining value quantifiers may include acquiring one or more real world items while dispersing as little value quantifiers as possible. In other embodiments, a user objective of maintaining value quantifiers may include storing as many value quantifiers as possible. In some embodiments, a user objective of maintaining value quantifiers may include distributing one or more value quantifiers across one or more distribution categories. A "distribution category" as used in this disclosure is a classification of a movement of one or more value quantifiers. Distribution categories may include, but are not limited to, storing, allotting, and/or sharing. In some embodiments, AR view 300 may display one or more distribution categories and/or one or more sums of value quantifiers. AR view 300 may display virtual icons representing value quantifiers. In some embodiments, virtual avatar 324 may provide guidance to a user having an objective of maintaining value quantifiers. AR view 300 may display one or more virtual icons representing one or more objects of interest that may be acquirable. AR view 300 may display data of one or more objects of interest, such as, but not limited to, values, values at other providers, online values, ingredients, and the like. In some embodiments, virtual avatar 324 may provide message 304, which may include data of one or more objects of interest. A user may select one or more input icons 320. An "input icon" as used in this disclosure is a graphic element denoting a method of communicating data. Input icons 320 may include, but are not limited to, microphones, chat boxes, speakers, and the like. Input icons 320 may prompt virtual avatar 324 to receive information from a user. For instance and without limitation, a user may select a microphone icon of input icons 320. A microphone icon may prompt virtual avatar 324 to "listen" for audio input of a user. AR view 300 may display an enlarged microphone icon which may indicate a timing window for a user to speak. Similarly, a user may select a chat box icon of input icons 320, which may prompt AR view 300 to display one or more chat boxes. A user may enter text information into one or more chat boxes of AR view 300. Virtual avatar 324 may respond to data received through chat box input by speaking, providing textual responses, and the like.

Still referring to FIG. 3, in some embodiments, apparatus 100 may generate a web search to provide responses for virtual avatar 324 to communicate to a user, as described above with reference to FIG. 1. For instance and without limitation, a user may ask "what's the cheapest coffee around me?" to which apparatus 100 may generate a web search and/or other query function to pull data relating to coffee values, coffee provider locations, coffee reviews, and the like. In some embodiments, virtual avatar 324 may provide message 304 as a function of user data. For instance and without limitation, user data may include one or more trends of dispersion of one or more value quantifiers, such as 40 value quantifiers being traded for coffee within a week. Real world object 316 may include coffee objects. Apparatus 100 may compare real world object 316 to user data of trading 40 value quantifiers for coffee within a seven day time span and may display this information through a virtual icon and/or message 304. Message 304 may include a summate total of value quantifiers traded within a time period, categories of objects of interest value quantifiers were traded for, and the like. For instance and without limitation, message 304 may communicate to a user that 10% of all value quantifiers were traded within a week for sandwiches, 40% of all value quantifiers were traded within a week for travel, and/or 50% of all value quantifiers were stored. In some embodiments, message 304 may include one or more alternative choices for a user. Alternative choices may include, but are not limited to, substitute objects of interest, substitute exercises, substitute language lesson modules, and the like. As a non-limiting example, a user may want to trade 30 value quantifiers for an article of clothing. Message 304 may suggest an alternative choice of an article of clothing valued at 15 value quantifiers, storing the 30 value quantifiers, and/or other possible choices. Apparatus 100 may determine alternative choices using any process as described throughout this disclosure, such as, without limitation, machine learning models, classifiers, objective functions, clustering algorithms, and the like.

Figure 4:
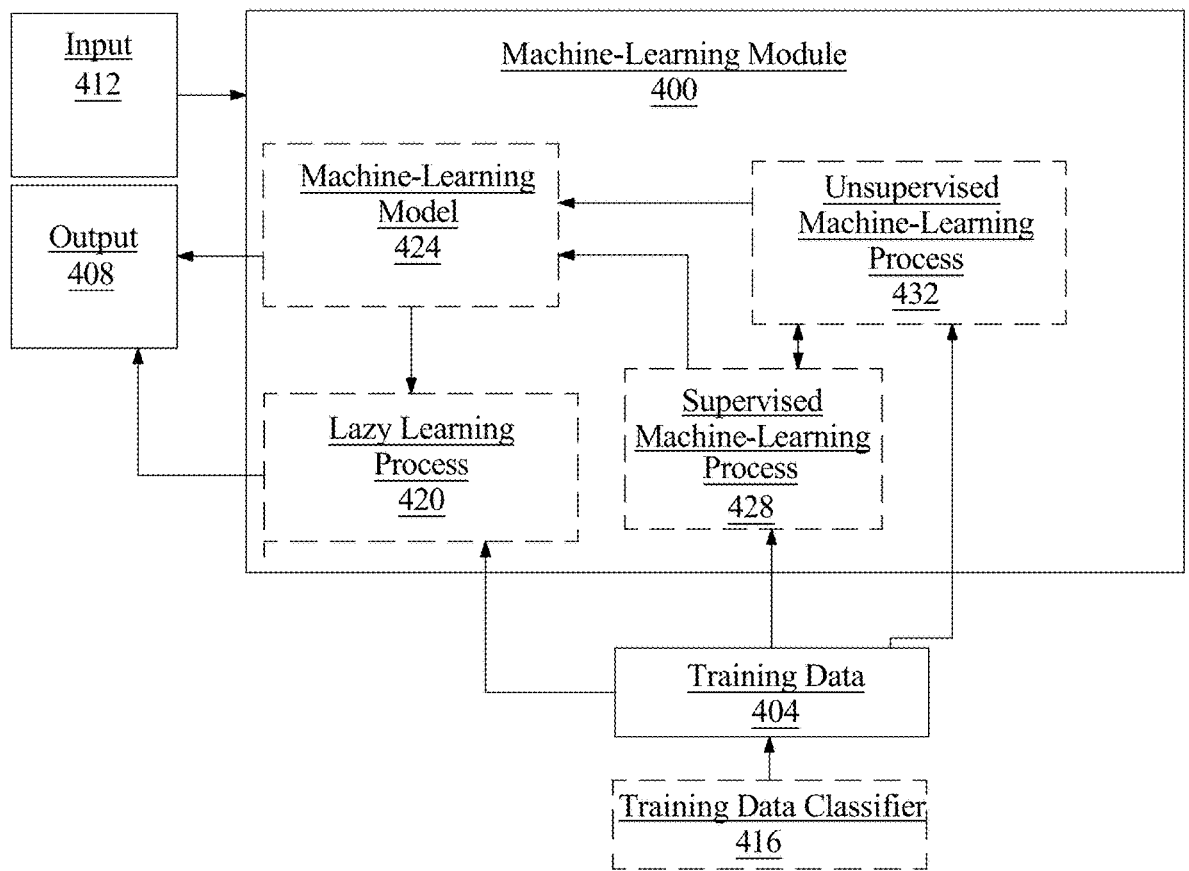
FIG. 4 is an embodiment of a machine learning model.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include optical data and output may include environmental elements.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to environmental element categories, objects of interest, and the like.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include optical data as described above as inputs, environmental elements as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
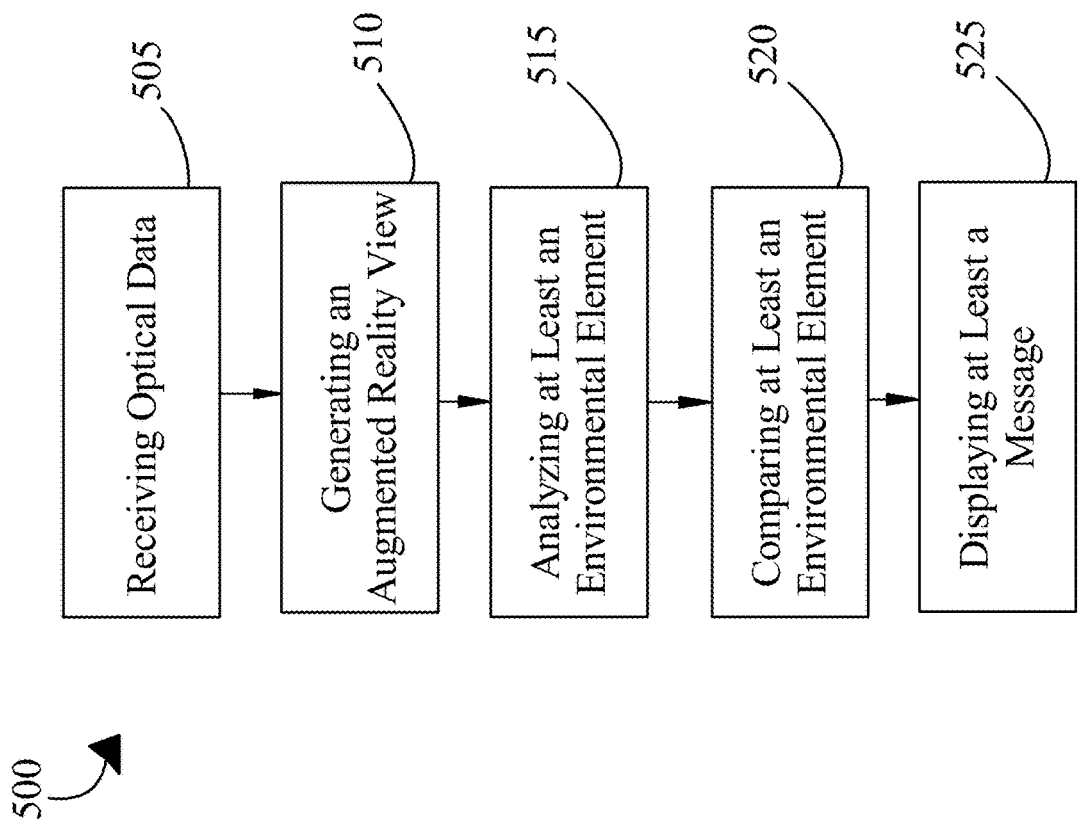
FIG. 5 is a flow diagram of a method of generating an augmented reality view.

Referring now to FIG. 5, method 500 of generating an augment reality view is presented. At step 505, method 500 includes receiving optical data. This step may be implemented as described above with reference to FIGS. 1-4, without limitation.

Still referring to FIG. 5, at step 510, method 500 includes generating an augmented reality view. This step may be implemented as described above with reference to FIGS. 1-4, without limitation.

Still referring to FIG. 5, at step 515, method 500 includes analyzing at least an environmental element. This step may be implemented as described above with reference to FIGS. 1-4, without limitation.

Still referring to FIG. 5, at step 520, method 500 includes comparing at least an environmental element. This step may be implemented as described above with reference to FIGS. 1-4, without limitation.

Still referring to FIG. 5, at step 525, method 500 includes displaying at least a message. This step may be implemented as described above with reference to FIGS. 1-4, without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
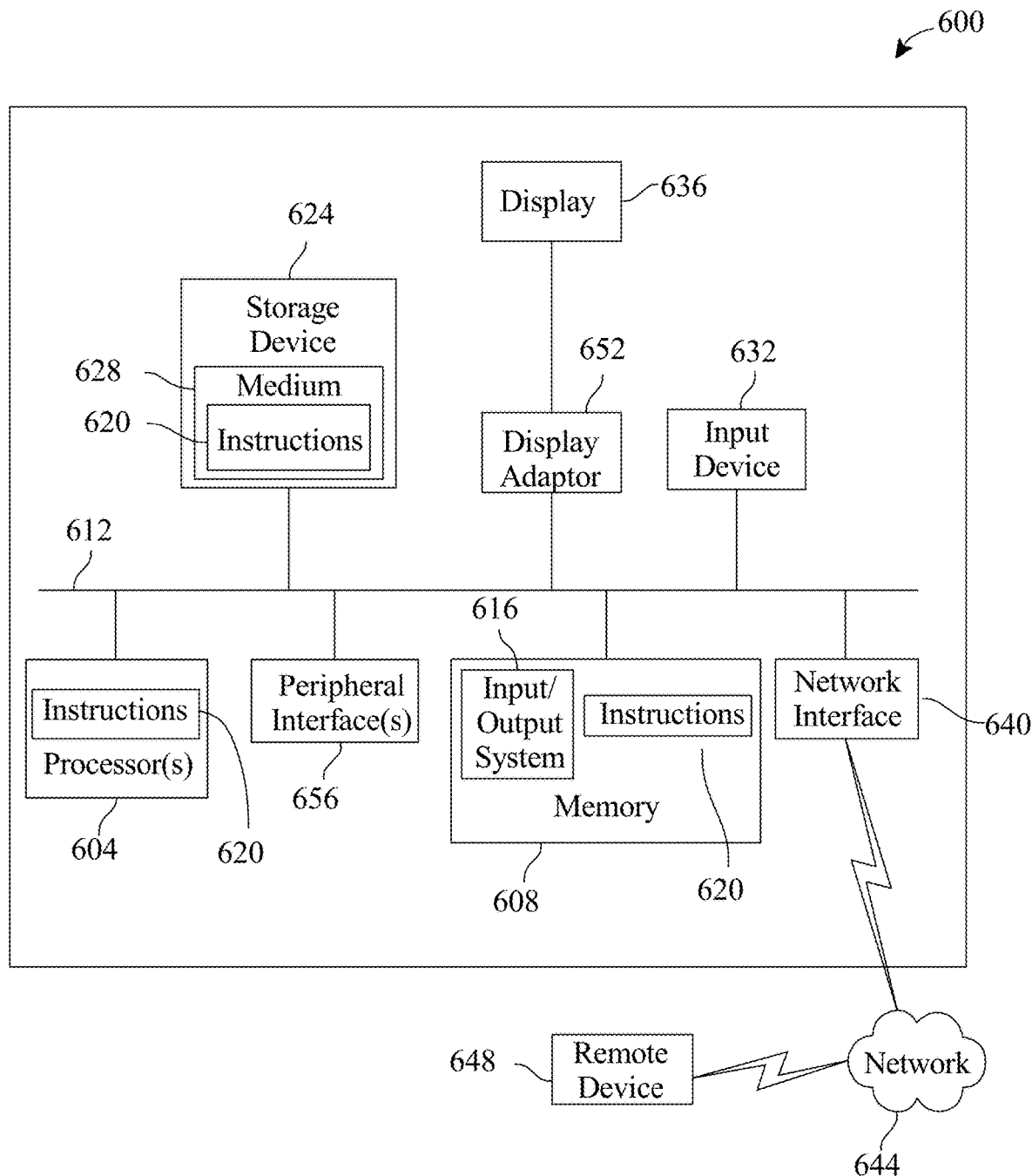
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Still referring to FIG. 6, processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors;

processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 6, memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Still referring to FIG. 6, computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Still referring to FIG. 6, computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

Still referring to FIG. 6, a user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Still referring to FIG. 6, computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an augmented reality, comprising:
at least a processor and a memory communicatively connected to the at least a processor, the memory containing instructions configuring the at least a processor to:
receive optical data through a sensing device in electronic communication with the at least a processor;
generate an augmented reality view through a display device of the at least a processor as a function of the optical data, wherein the augmented reality view comprises a virtual avatar;
analyze at least an environmental element of the optical data, wherein analyzing the at least environmental element comprises:
training a feature learning algorithm configured to:
perform a clustering analysis to create a plurality of environmental data sets, wherein performing the clustering analysis comprises calculating a degree of similarity index value; and
detect co-occurrences among the plurality of environmental element datasets;
compare the at least an environmental element to a priority threshold; and
display at least a message through the display device of the at least a processor as a function of the comparison.

2. The apparatus of claim 1, wherein the augmented reality view comprises at least a virtual icon.

3. The apparatus of claim 1, wherein the virtual avatar is programmed to:
receive communication from a user;
determine a response as a function of the communication; and
communicate the at least a message to the user as a function of the response.

4. The apparatus of claim 3, wherein communication is received through a chatbot generated through the at least a processor and displayed through the augmented reality view.

5. The apparatus of claim 1, wherein the at least a message is generated as a function of user data.

6. The apparatus of claim 1, wherein the at least a processor is further configured to modify the augmented reality view as a function of an audio input.

7. The apparatus of claim 1, wherein analyzing the at least an environmental element includes analyzing text of the optical data through a language processing module.

8. The apparatus of claim 1, wherein analyzing the at least an environmental element of the optical data includes utilizing a machine vision process, wherein the machine vision process inputs optical data and outputs information of the optical data.

9. The apparatus of claim 1, wherein the at least a message comprises environmental data.

10. The apparatus of claim 1, wherein the virtual avatar is programmed to animate as a function of the at least an environmental element.

11. A method of generating an augmented reality using a computing device, comprising:
receive optical data through a sensing device in electronic communication with the at least a processor;
generate an augmented reality view through a display device as a function of the optical data, wherein the augmented reality view comprises a virtual avatar;
analyze at least an environmental element of the optical data, wherein analyzing the at least environmental element comprises:
training a feature learning algorithm configured to:
perform a clustering analysis to create a plurality of environmental data sets, wherein performing the clustering analysis comprises calculating a degree of similarity index value; and
detect co-occurrences among the plurality of environmental element datasets;
compare the at least an environmental element to a priority threshold; and
display at least a message through the display device as a function of the comparison.

12. The method of claim 11, wherein the augmented reality view comprises at least a virtual icon.

13. The method of claim 11, wherein the virtual avatar is programmed to:
receive communication from a user;
determine a response as a function of the communication; and
communicate the at least a message to the user as a function of the response.

14. The method of claim 13, wherein communication is received through a chatbot generated through the at least a processor and displayed through the augmented reality view.

15. The method of claim 11, wherein the at least a message is generated as a function of user data.

16. The method of claim 11, wherein the at least a processor is further configured to modify the augmented reality view as a function of received audio input.

17. The method of claim 11, wherein analyzing the at least an environmental element includes analyzing text of the optical data through a language processing module.

18. The method of claim 11, wherein analyzing the at least an environmental element of the optical data includes utilizing a machine vision process, wherein the machine vision process inputs optical data and outputs information of the optical data.

19. The method of claim 11, wherein the at least a message comprises environmental data.

20. The method of claim 11, wherein the virtual avatar is programmed to animate as a function of the at least an environmental element.

* * * * *